(12) United States Patent
Minuth et al.

(10) Patent No.: US 6,682,140 B2
(45) Date of Patent: Jan. 27, 2004

(54) MOTOR VEHICLE SEAT

(75) Inventors: Karl-Heinz Minuth, Grafenau (DE); Karl Pfahler, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/371,083

(22) Filed: Feb. 20, 2003

(65) Prior Publication Data

US 2003/0160479 A1 Aug. 28, 2003

(30) Foreign Application Priority Data

Feb. 22, 2002 (DE) .......................... 102 07 489

(51) Int. Cl.⁷ ............................... A47C 31/00
(52) U.S. Cl. ................................. 297/180.14
(58) Field of Search ................ 297/180.14, 180.13, 297/180.1

(56) References Cited

U.S. PATENT DOCUMENTS

| 5,927,817 | A | * | 7/1999 | Ekman et al. |
| 6,003,950 | A | * | 12/1999 | Larsson |
| 6,019,420 | A | * | 2/2000 | Faust et al. |
| 6,106,057 | A | * | 8/2000 | Lee |
| 6,189,966 | B1 | * | 2/2001 | Faust et al. |
| 6,196,627 | B1 | * | 3/2001 | Faust et al. |
| 6,291,803 | B1 | | 9/2001 | Fourrey |

FOREIGN PATENT DOCUMENTS

| DE | 197 39 388 | 3/1999 |
| DE | 199 20 062 | 11/2000 |
| DE | 100 47 754 | 4/2002 |

* cited by examiner

*Primary Examiner*—Milton Nelson, Jr.
(74) *Attorney, Agent, or Firm*—Kenyon & Kenyon

(57) ABSTRACT

In a motor vehicle seat having a backrest, the padding of which includes a ventilation layer through which air can flow with the aid of a fan of a ventilation device, the backrest provided on its rear side with a soft trim part from which at least one air inlet opening for the ventilation device has been left open.

The air inlet opening is arranged in the upper region of the soft trim part of the backrest and in the region of overlap with the associated fan of the ventilation device, the air inlet opening covered by a covering arranged on the soft trim part.

5 Claims, 1 Drawing Sheet

MOTOR VEHICLE SEAT

CROSS-REFERENCE TO RELATED APPLICATIONS

The present application claims priority from Application No. 102 07 489.5, filed in the Federal Republic of Germany on Feb. 22, 2002, which is expressly incorporated herein in its entirety by reference thereto.

FIELD OF THE INVENTION

The present invention relates to a motor vehicle seat.

BACKGROUND INFORMATION

German Published Patent Application No. 197 39 388 describes a seat of this type having a backrest, the padding of which includes a ventilation layer through which air can flow with the aid of a fan of a ventilation device. The backrest has on its rear side a soft trim part, at the lower end of which an air inlet opening for the ventilation device has been left open.

It is an object of the present invention to provide a seat for a motor vehicle with a ventilation device having improved efficiency.

SUMMARY

The above and other beneficial objects of the present invention are achieved by providing a motor vehicle seat as described herein.

In the case of the motor vehicle seat according to the present invention, the air inlet opening is arranged in the upper region of the soft trim part of the backrest. A dry air flow, which emerges from the air conditioning system in the region of the dashboard and which flows toward the rear below the roof and drops down behind the vehicle seats, may thereby pass over the shortest route to the air inlet opening— without already having absorbed an excessive amount of moisture from the interior. In addition, the shortest route to the fan of the ventilation device may be achieved by it being possible for the fan to be arranged in the region of overlap with the associated air inlet opening and for it to receive the dry air directly.

The air inlet opening may be arranged in the transitional region between outer regions and a central region of the soft trim part, as a result of which the best possible covering of the inlet openings may be realized.

Further aspects, features and details of the present invention are described below with reference to an exemplary embodiment and with reference to the drawings.

DETAILED DESCRIPTION

Figure 1:
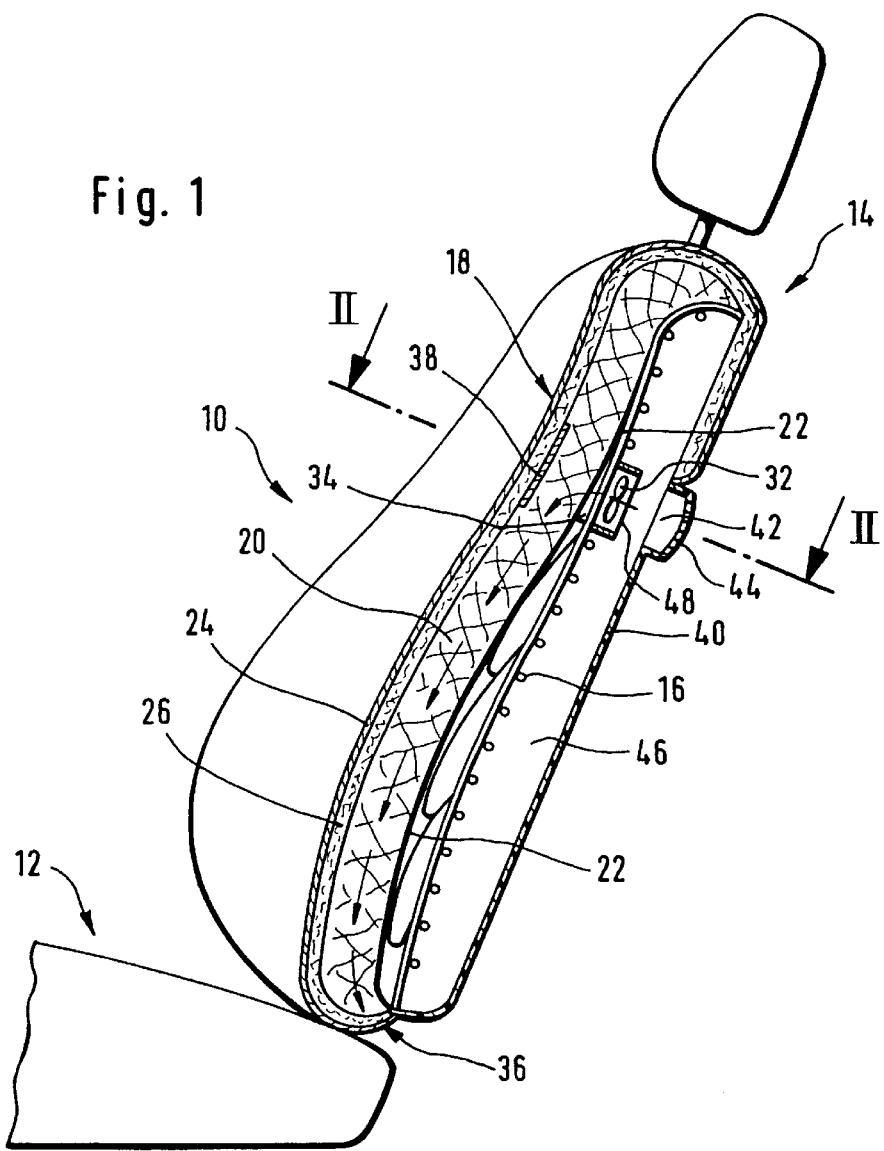
FIG. 1 is a schematic cross-sectional view through a seat arranged in the interior of a motor vehicle, along a vertical section plane extending in the longitudinal direction of the vehicle.

In FIG. 1, a seat 10, which is arranged in the interior of a motor vehicle, having a seat part 12 and a backrest 14 is illustrated in a schematic cross-sectional view along a vertical section plane extending in the longitudinal direction of the vehicle. The backrest 14 includes a padding support 16, which is fastened to a backrest frame and supports padding 18. In the exemplary embodiment illustrated, the padding support is arranged as a wire mesh, but, for example, a plastic shell is also possible. The padding 18 includes a ventilation layer 20 through which air may flow and which consists of roughly textured nonwoven material, for example, rubberized hair, or a spacer knit, and an air-impermeable padding layer 22 which rests in a pressure-distributing manner on the padding support 16 and completely overlaps the rear side of the ventilation layer 20. Multicontoured bubbles 30, which may be varied in their thickness by air, are arranged in the panel region of the backrest between the padding support 16 and the padding layer 22. The front side of the padding 18, which side faces away from the padding layer 22, is covered by air-permeable upholstery 24 consisting of textile material or perforated leather or plastic with a lower layer 26 consisting of padding wadding, a woolen nonwoven organ open-pored and optionally perforated foam material, etc. being arranged between the ventilation layer 20 and upholstery 24. In the exemplary embodiment illustrated, heating wires of an electrical seat heating system are also arranged within the lower layer 26.

The ventilation layer 20 is to be supplied with air by at least one electrically operated fan 32. For this purpose, the ventilation layer 20 has an inflow opening 34 for the air flow entering from the fan 32, and an outflow opening 36 for the air flow being discharged at the lower end of the backrest 14. In the region of the inflow opening 34, the ventilation layer 20 is covered on its side facing away from the padding layer 22 by a blocking layer 38, for example, of plastic film, so that the air passing from the fan 32 via the inflow opening 34 into the ventilation layer 20 does not flow on a horizontal route through the ventilation layer 20 and does not emerge through the upholstery 24. On the contrary, the air flow passing into the ventilation layer 20 via the inflow opening 34 is deflected downwardly at the blocking layer 38 in order to flow through the ventilation layer 20. The backrest 14 is provided on its rear side with a soft trim part 40 which consists of plastic and is fastened to the backrest frame. An air inlet opening 42 for the fan 32 of the ventilation device is left open on the soft trim part 40 with the air inlet opening 42 arranged in the region of overlap with the associated fan 32 in order to provide a direct route between entering air and fan 32. The air inlet opening 42 is covered by a covering 44 which is arranged on the soft trim part 40 and is arranged, for example, as a grating or cover provided with openings. The soft trim part 40 of the backrest 14 is arranged at a distance behind the padding support 16, the fan 32 being at least partially arranged within the gap 46 between the soft trim part 40 and padding support 16. In the exemplary embodiment illustrated, the air inlet 48 of the fan 32 is arranged at a distance from the air inlet opening 42 in the soft trim part 40. However, it is possible for an air duct 49, which is indicated by dash-dotted lines in FIG. 2, to be provided between the air inlet 48 of the fan 32 and the air inlet opening 42 in the soft trim part 40.

Figure 2:
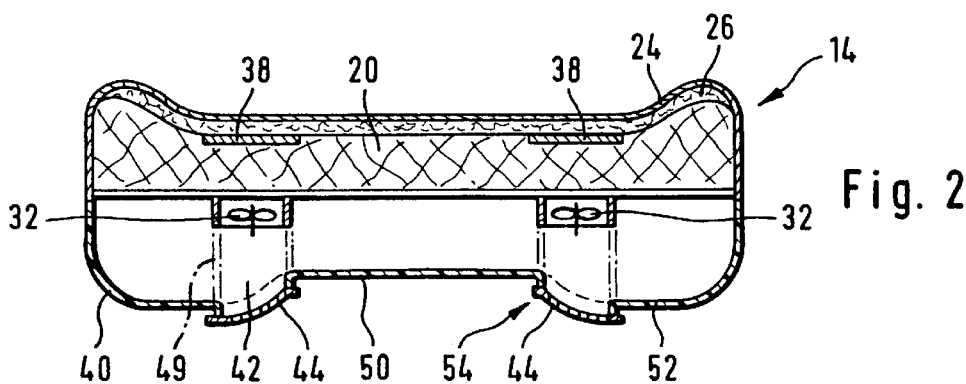
FIG. 2 is a schematic cross-sectional view through the backrest of the seat taken along the line II—II illustrated in FIG. 1.

FIG. 2 is a schematic cross-sectional view through the backrest 14 taken along the line II—II illustrated in FIG. 1, the soft trim part 40 including in the central region 50 a knee depression which is bounded laterally by outer-regions 52. In the exemplary embodiment illustrated, two fans 32 for supplying the ventilation layer 20 with air are provided in the upper region of the backrest 14. The air inlet openings 42 of the two fans 32 are left open in each case in the associated transitional region 54 between the central region 50 and the outer regions 52 and are covered by the coverings 44.

What is claimed is:

1. A motor vehicle seat, comprising:

a backrest including padding having a ventilation layer, a rear side of the backrest including a soft trim part having an air inlet opening;

a ventilation device including a fan configured to flow air through the ventilation layer; and a covering provided on the soft trim part and arranged to cover the air inlet opening;

wherein the air inlet opening is arranged in an upper region of the soft trim part and in a region of overlap with the fan.

2. The motor vehicle seat according to claim 1, further comprising a padding support, the soft trim part arranged at a distance behind the padding support, the fan at least partially arranged in a gap between the soft trim part and the padding support.

3. The motor vehicle seat according to claim 2, wherein an air inlet of the fan is arranged at a distance from the air inlet opening in the soft trim part.

4. The motor vehicle seat according to claim 3, further comprising an air duct arranged between the air inlet of the fan and the air inlet opening in the soft trim part.

5. The motor vehicle seat according to claim 1, wherein the soft trim part includes a knee depression in a central region, the air inlet opening arranged in a transitional region between the central region and outer regions laterally bounding the central region.

* * * * *

UNITED STATES PATENT AND TRADEMARK OFFICE
CERTIFICATE OF CORRECTION

PATENT NO. : 6,682,140 B2
DATED : January 27, 2004
INVENTOR(S) : Milnuth et al.

It is certified that error appears in the above-identified patent and that said Letters Patent is hereby corrected as shown below:

Column 2,
Line 19, change "organ" to -- or an --; and
Line 61, change "outer-regions" to -- outer regions --.

Signed and Sealed this

Ninth Day of May, 2006

JON W. DUDAS
*Director of the United States Patent and Trademark Office*